(12) United States Patent
Lynch et al.

(10) Patent No.: US 6,326,444 B2
(45) Date of Patent: *Dec. 4, 2001

(54) PREPARATION OF POLYMERS OF ALKENES BY SUSPENSION POLYMERIZATION

(75) Inventors: John Lynch, Monsheim; David Fischer, Gönnheim; Hans-Helmut Görtz, Freinsheim; Günther Schweier, Friedelsheim, all of (DE)

(73) Assignee: Basell Polyolefin GmbH, Kehl (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,657

(22) PCT Filed: Feb. 19, 1997

(86) PCT No.: PCT/EP97/00771

§ 371 Date: Aug. 4, 1998

§ 102(e) Date: Aug. 4, 1998

(87) PCT Pub. No.: WO97/31029

PCT Pub. Date: Aug. 28, 1997

(30) Foreign Application Priority Data

Feb. 20, 1996 (DE) ............................................. 196 06 166

(51) Int. Cl.$^7$ ................................ C08F 4/02; C08F 4/52; C08F 4/642

(52) U.S. Cl. ..................... 526/133; 526/132; 526/160; 526/943; 502/117

(58) Field of Search .................... 526/160, 132, 526/133, 943

(56) References Cited

U.S. PATENT DOCUMENTS

| 3,242,150 | 3/1966 | Scoggin | 260/88 |
|---|---|---|---|
| 3,248,179 | 4/1966 | Norwood | 23/285 |
| 5,756,607 | * 5/1998 | Lux et al. | 526/127 |
| 5,834,393 | * 10/1998 | Jacobsen et al. | 502/152 |

FOREIGN PATENT DOCUMENTS

| 2116404 | 9/1994 | (CA) . |
|---|---|---|
| 500 944 A1 | * 9/1992 | (EP) . |
| 589638 | 3/1994 | (EP) . |
| 613908 | 9/1994 | (EP) . |
| 628574 | 12/1994 | (EP) . |
| 628 574 A1 | * 12/1994 | (EP) . |
| 91/09882 | 7/1991 | (WO) . |
| 94/03506 | 2/1994 | (WO) . |
| 95/14044 | 5/1995 | (WO) . |
| WO 95/15815 | * 6/1995 | (WO) . |
| WO 95/18160 | * 7/1995 | (WO) . |

OTHER PUBLICATIONS

Wiesenfeldt et al., *J. of Org. Chem.*, vol. 369, 1989, pp. 359–370.

* cited by examiner

Primary Examiner—David W. Wu
Assistant Examiner—R. Rabago
(74) Attorney, Agent, or Firm—Keil & Weinkauf

(57) ABSTRACT

Polymers of alkenes are prepared by suspension polymerization in the presence of catalyst systems by a process in which the catalyst systems used are supported catalyst systems obtainable by A) reaction of an inorganic carrier with a metal compound of the general formula I $$M^1(R^1)_r(R^2)_s(R^3)_t(R^4)_u \qquad \text{I}$$

where
  $M^1$ is an alkali metal, an alkaline earth metal or a metal of main group III or IV of the Periodic Table,
  $R^1$ to $R^7$ are variously halogen, alkoxy, dialkylamino, hydrogen, $C_1$–$C_{10}$-alkyl, $C_6$–$C_{15}$-aryl, alkylaryl or arylalkyl each having 1 to 10 carbon atoms in the alkyl radical and 6 to 20 carbon atoms in the aryl radical,
  r, s, t and u are integers from 1 to 4 the sum r+s+t+u corresponding to the valency of $M^1$, B) reaction of the material obtained according to A) with a metallocene complex in its metal dihalide form and a compound forming metallocenium ions and C) subsequent reaction with a metal compound of the general formula II $$M^2(R^5)_o(R^6)_p(R^7)_q \qquad \text{II.}$$

11 Claims, No Drawings

PREPARATION OF POLYMERS OF ALKENES BY SUSPENSION POLYMERIZATION

The present invention relates to a process for the preparation of polymers of alkenes by suspension polymerization in the presence of catalyst systems.

The present invention furthermore relates to the resulting polymers of alkenes, the use of these polymers for the production of fibers, films and moldings and the fibers, films and moldings obtainable therefrom.

A preparation process for polymers of ethylene by suspension polymerization is described, for example, in WO 95/18160. Here, however, the dry catalyst is pyrophoric and already active with respect to polymerization.

WO 91/09882 discloses the preparation of a supported, cationic metallocene catalyst by applying the reaction mixture of a dialkymetallocene with an ionic compound, which has a Brönsted acid as the cation and a noncoordinating opposite ion, such as tetrakis(pentafluorophenyl)borate as the anion to an inorganic carrier. Here too, an active catalyst is obtained.

Similar supported catalyst systems are also disclosed in WO 94/03506 and WO 95/14044.

EP-A 628 574 describes supported catalyst systems in which a metallocene dihalide is reacted with an alkylaluminum in the presence of a hydridoborate and this solution, which is active with respect to polymerization, is applied to a carrier.

Such already active catalysts readily give rise to problems in the metering of the catalyst into the reactor.

A catalyst which is still inactive and can be activated only subsequently, for example during metering or only in the reactor, is therefore advantageous.

EP-A 613 908 discloses supported metallocene catalyst systems, some of which are not activated until they are in the reactor. Here, however, the polymers formed have a broad molecular weight distribution $M_w/M_n$.

WO 95/15815 describes catalysts which are obtained by applying a metallocene dichloride and a borate to a crosslinked polymer as a carrier. The use of deactivated inorganic carriers gives catalysts which, after activation in the polymerization reactor, have either only slight activity or no activity at all.

It is an object of the present invention to provide a process for the preparation of polymers of alkenes by suspension polymerization, which process does not have the stated disadvantages and in which in particular the catalyst system can be activated at any desired time, the catalyst system is air- and moisture-insensitive, can be stored for a long time and is not pyrophoric and the polymers formed have a narrow molecular weight distribution.

We have found that this object is achieved by a process for the preparation of polymers of alkenes by suspension polymerization in the presence of catalyst systems, wherein the catalyst systems used are supported catalyst systems obtainable by A) reaction of an inorganic carrier with a metal compound of the general formula I

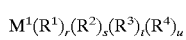   I where
M$^1$ is an alkali metal, an alkaline earth metal or a metal of main group III or IV of the Periodic Table,
R$^1$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical,
R$^2$ to R$^4$ are each hydrogen, halogen, $C_1$–$C_{10}$-alkyl, $C_6$–$C_{15}$-aryl, alkylaryl, arylalkyl, alkoxy or dialkylamino, each having 1 to 10 carbon atoms in the alkyl radical and 6 to 20 carbon atoms in the aryl radical,
r is an integer from 1 to 4 and
s, t and u are integers from 0 to 3, the sum r+s+t+u corresponding to the valency of M$^1$, B) reaction of the material obtained according to A) with a metallocene complex in its metal dihalide form and a compound forming metallocenium ions and C) subsequent reaction with a metal compound of the general formula II

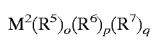   II in which
M$^2$ is an alkali metal, an alkaline earth metal or a metal of main group III of the Periodic Table,
R$^5$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical,
R$^6$ and R$^7$ are each hydrogen, halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical,
o is an integer from 1 to 3 and
p and q are integers from 0 to 2, the sum o+p+q corresponding to the valency of M$^2$.

We have also found the polymers of alkenes which are obtainable thereby, their use for the production of fibers, films and moldings and the fibers, films and moldings obtainable therefrom.

The novel process is used for the preparation of polymers of alkenes. The term polymers is understood as meaning both homopolymers and copolymers. Particularly suitable alkenes are alk-1-enes, preferably ethylene and propylene, in particular ethylene. Alk-1-enes are also suitable as comonomers, preferably straight-chain $C_4$–$C_{10}$-alk-1-enes, in particular but-1-ene, hex-1-ene and oct-1-ene. However, it is also possible to use other alkenes, for example cycloolefins or higher alkenes.

Supported catalyst systems which are obtainable by reacting an inorganic carrier with a metal compound of the general formula I in a first stage A) are used as supported catalyst systems.

The carriers used are preferably finely divided solids whose particle diameters are from 1 to 200 $\mu$m, in particular from 30 to 70 $\mu$m.

Examples of suitable carriers are silica gels, preferably those of the formula $SiO_2 \cdot a\ Al_2O_3$, where a is from 0 to 2, preferably from 0 to 0.5; these are therefore aluminosilicates or silica. Such products are commercially available, for example Silica Gel 332 from Grace.

Other inorganic compounds, such as $Al_2O_3$ or $MgCl_2$, or mixtures containing these compounds may also be used as carriers.

Preferred metal compounds of the general formula I are those in which M$^1$ is a metal of main group III of the Periodic Table, in particular aluminum, R$^1$ is $C_1$–$C_{10}$-alkyl and R$^2$ to R$^4$ are each $C_1$–$C_{10}$-alkyl. For the particularly preferred case where M$^1$ is aluminum, u is zero and R$^1$ to R$^3$ have in particular the same meaning, preferably methyl, ethyl, isobutyl or hexyl, preferably isobutyl.

The metal compound of the general formula I is preferably added as a solution to a suspension of the carrier. Particularly suitable solvents or suspending agents are hydrocarbons, such as heptane. The amount of metal compound I can be varied within wide limits, the minimum amount depending on the number of hydroxyl groups of the carrier. The temperatures, reaction times and pressures are not critical per se, temperatures of from 0 to 80° C. and reaction times of from 0.1 to 48 hours being preferred.

It has proven suitable to remove the excess metal compound I by thorough washing, for example with hydrocarbons, such as pentane or hexane, after the carrier pretreatment and to dry the carrier.

The material thus prepared can be stored for up to 6 months and is not pyrophoric.

This material is then reacted, in a further stage B), with a metallocene complex in its metal dihalide form and a compound forming metallocenium ions.

Examples of suitable metallocene complexes are compounds of the general formula III:

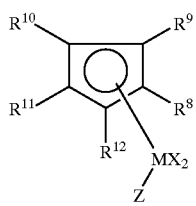

III where
  M is titanium, zirconium, hafnium, vanadium, niobium or tantalum,
  x is fluorine, chlorine, bromine or iodine,
  $R^8$ to $R^{12}$ are each hydrogen, $C_1$–$C_{10}$-alkyl, 5- to 7-membered cycloalkyl which in turn may carry a $C_1$–$C_{10}$-alkyl as a substituent, $C_6$–$C_{15}$-aryl or arylalkyl, where two adjacent radicals together may furthermore form a cyclic group of 4 to 15 carbon atoms, or $Si(R^{13})_3$,
where
  $R^{13}$ is $C_1$–$C_{10}$-alkyl, $C_3$–$C_{10}$-cycloalkyl or $C_6$–$C_{15}$-aryl, Z is X or

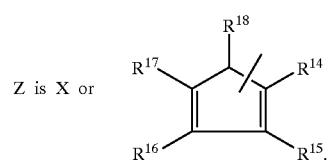

where
  $R^{14}$ to $R^{18}$ are each hydrogen, $C_1$–$C_{10}$-alkyl, 5- to 7-membered cycloalkyl which in turn may carry a $C_1$–$C_{10}$-alkyl as a substituent, $C_6$–$C_{15}$-aryl or arylalkyl, where two adjacent radicals together may furthermore form a cyclic group of 4 to 15 carbon atoms, or $Si(R^{19})_3$, where
  $R^{19}$ is $C_1$–$C_{10}$-alkyl, $C_6$–$C_{15}$-aryl or $C_3$–$C_{10}$-cycloalkyl, or $R^{11}$ and Z together form a group —$R^{20}$—A—, in which $R^{20}$ is 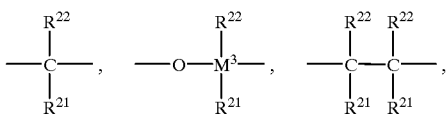

-continued

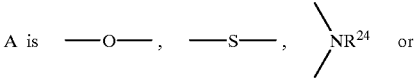

=$BR^{22}$, =$AlR^{22}$, —Ge—, —Sn—, —O—, —S—, =SO, =$SO_2$, =$NR^{22}$, =CO, =$PR^{22}$ or =P(O)$R^{22}$, where
  $R^{21}$, $R^{22}$ and $R^{23}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or where two adjacent radicals, each with the atoms linking them, form a ring, and
  $M^3$ is silicon, germanium or tin, A is —O—, —S—, 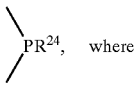 or \>$PR^{24}$, where $R^{24}$ is $C_1$–$C_{10}$-alkyl, $C_6$–$C_{15}$-aryl, $C_3$–$C_{10}$-cycloalkyl, alkylaryl or $Si(R^{25})_3$, and
  $R^{25}$ is hydrogen, $C_1$–$C_{10}$-alkyl, $C_6$–$C_{15}$-aryl, which in turn may be substituted by $C_1$–$C_4$-alkyl, or $C_3$–$C_{10}$-cycloalkyl, or where
  $R^{11}$ and $R^{17}$ together form a group —$R^{20}$—.

Among the metallocene complexes of the general formula III,

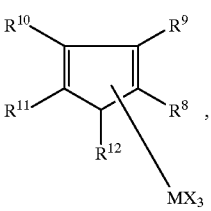

IIIa

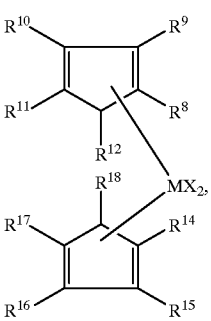

IIIb

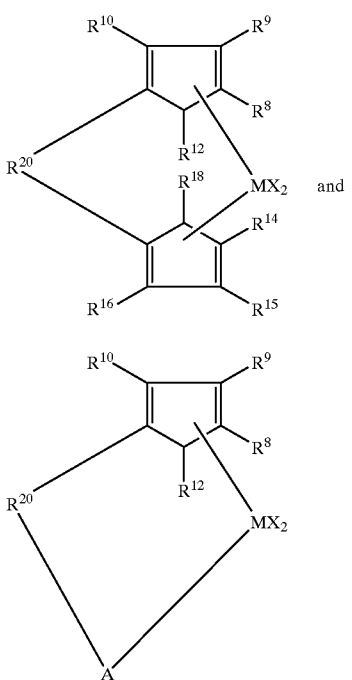

are preferred.

The radicals X may be identical or different but are preferably identical.

Among the compounds of the formula IIIa, those in which

M is titanium, zirconium or hafnium,

X is chlorine and $R^8$ to $R^{12}$ are each hydrogen or $C_1$–$C_4$-alkyl are particularly preferred.

Among the compounds of the formula IIIb, those in which

M is titanium, zirconium or hafnium,

X is chlorine, $R^8$ to $R^{12}$ are each hydrogen, $C_1$–$C_4$-alkyl or $Si(R^{13})_3$ and $R^{14}$ to $R^{18}$ are each hydrogen, $C_1$–$C_4$-alkyl or $Si(R^{19})_3$, are preferred.

The compounds of the formula IIIb in which the cyclopentadienyl radicals are identical are particularly suitable.

Examples of particularly suitable compounds include bis(cyclopentadienyl)zirconium dichloride, bis(pentamethylcyclopentadienyl)zirconium dichloride, bis(methylcyclopentadienyl)zirconium dichloride, bis(ethylcyclopentadienyl)zirconium dichloride, bis(n-butylcyclopentadienyl)zirconium dichloride and bis(trimethylsilylcyclopentadienyl)zirconium dichloride.

Particularly suitable compounds of the formula IIIc are those in which $R^8$ and $R^{14}$ are identical or different and are each hydrogen or $C_1$–$C_{10}$-alkyl, $R^{12}$ and $R^{18}$ are identical or different and are each hydrogen, methyl, ethyl, isopropyl or tert-butyl, $R^{10}$ and $R^{16}$ are each $C_1$–$C_4$-alkyl, $R^9$ and $R^{15}$ are each hydrogen or two adjacent radicals $R^9$ and $R^{10}$ on the one hand and $R^{15}$ and $R^{16}$ on the other hand together form a cyclic group of 4 to 12 carbon atoms,

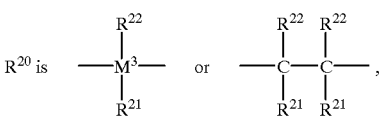

M is titanium, zirconium or hafnium and

X is chlorine.

Examples of particularly suitable complex compounds include dimethylsilanediylbis(cyclopentadienyl)zirconium dichloride, dimethylsilanediylbis(indenyl)zirconium dichloride, dimethylsilanediylbis(tetrahydroindenyl) zirconium dichloride, ethylenebis(cyclopentadienyl) zirconium dichloride, ethylenebis(indenyl)zirconium dichloride, ethylenebis(tetrahydroindenyl)zirconium dichloride, tetramethylethylene-9-fluoroenylcyclopentadienylzirconium dichloride, dimethylsilanediylbis(-3-tert-butyl-5-methylcyclopentadienyl)-zirconium dichloride, dimethylsilanediylbis(-3-tert-butyl-5-ethylcyclopentadienyl)-zirconium dichloride, dimethylsilanediylbis(-2-methylindenyl)zirconium dichloride, dimethylsilanediylbis(-2-isopropylindenyl) zirconium dichloride, diethylsilanediylbis(-2-tert-butylindenyl)zirconium dichloride, dimethylsilanediylbis(-2-methylindenyl) zirconium dibromide, dimethylsilanediylbis(-3-methyl-5-methylcyclopentadienyl)-zirconium dichloride, dimethylsilanediylbis(-3-ethyl-5-isopropylcyclopentadienyl)- zirconium dichloride, dimethylsilanediylbis(-2-methylindenyl)zirconium dichloride, dimethylsilanediylbis(-2-methylbenzindenyl) zirconium dichloride and dimethylsilanediyibis(-2-methylindenyl)hafnium dichloride.

Particularly suitable compounds of the general formula IIId are hose in which

M is titanium or zirconium,

X is chlorine,

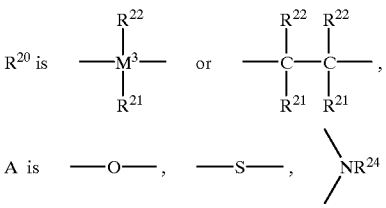

and $R^8$ to $R^{10}$ and $R^{12}$ are each hydrogen, $C_1$–$C_{10}$-alkyl, $C_3$–$C_{10}$-cyclo-alkyl, $C_6$–$C_{15}$-aryl or $Si(R^{14})_3$, or where two adjacent radicals form a cyclic group of 4 to 12 carbon atoms.

The synthesis of such complex compounds can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in J. Organometal. Chem. 369 (1989), 359–370.

Mixtures of different metallocene complexes may also be used.

Particularly suitable compounds forming metallocenium ions are strong, neutral Lewis acids, ionic compounds having Lewis acid cations and ionic compounds having Brönsted acids as cations.

Preferred strong, neutral Lewis acids are compounds of the general formula IV $$M^4X^1X^2X^3 \quad\quad IV$$

where
M$^4$ is an element of main group III of the Periodic Table, in particular B, Al or Ga, preferably B, and X$^1$, X$^2$ and X$^3$ are each hydrogen, C$_1$–C$_{10}$-alkyl, C$_6$–C$_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred compounds of the general formula IV are those in which X$^1$, X$^2$ and X$^3$ are identical, preferably tris(pentafluorophenyl)borane.

Suitable ionic compounds having Lewis acid cations are compounds of the general formula V $$[(Y^{a+})Q_1Q_2\ldots Q_z]^{d+} \quad\quad V$$

where
Y is an element of main groups I to VI or subgroups I to VIII of the Periodic Table,
Q$_1$ to Q$_z$ are each radicals having a single negative charge, such as C$_1$–C$_{28}$-alkyl, C$_6$–C$_{15}$-aryl, alkylaryl, arylalkyl, haloalkyl, haloaryl, each having 6 to 28 carbon atoms in the aryl radical and 1 to 28 carbon atoms in the alkyl radical, C$_1$–C$_{10}$-cycloalkyl, which may be substituted by C$_1$–C$_{10}$-alkyl, or halogen, C$_1$–C$_{28}$-alkoxy, C$_6$–C$_{15}$-aryloxy, silyl or mercaptyl,
a is an integer from 1 to 6,
z is an integer from 0 to 5 and
d is the difference a–z, but d is greater than or equal to 1.

Carbonium cations, oxonium cations and sulfonium cations as well as cationic transition metal complexes are particularly suitable. Particular examples are the triphenylmethyl cation, the silver cation and the 1,1'-dimethylferrocenyl cation. They preferably have noncoordinating opposite ions, in particular boron compounds, as also mentioned in WO 91/09882, preferably tetrakis (pentafluorophenyl)borate.

Ionic compounds having Brönsted acids as cations and preferably likewise noncoordinating opposite ions are mentioned in WO 91/09882; a preferred cation is N,N-dimethylanilinium.

The amount of compounds forming metallocenium ions is preferably from 0.1 to 10 equivalents, based on the metallocene complex III.

The conditions for the reaction of the metallocene complex with the compound forming metallocenium ions are not critical per se, but the reaction is preferably carried out in solution, particularly suitable solvents being hydrocarbons, preferably aromatic hydrocarbons, such as toluene.

The material prepared according to A) is then added to this. An amount of from 0.1 to 10% by weight, based on the inorganic carrier, of metallocene complex is particularly suitable. The conditions for this reaction are likewise not critical; temperatures of from 20 to 80° C. and reaction times of from 0.1 to 20 hours have proven particularly suitable.

The material obtained according to B) can then be isolated and can be stored for up to at least 6 months.

In a further stage C), the activation stage, the material obtained according to B) is reacted with a metal compound of the general formula II. This activation can be carried out at any desired time, i.e. before, during or after the metering of the material obtained according to B) into the reactor. The activation is preferably affected after the material obtained according to B) has been metered into the reactor.

Among the metal compounds of the general formula II $$M^2(R^5)_o(R^6)_p(R^7)_q \quad\quad II$$

where
M$^2$ is an alkali metal, an alkaline earth metal or a metal of main group III of the Periodic Table, ie. boron, aluminum, gallium, indium or thallium,
R$^5$ is hydrogen, C$_1$–C$_{10}$-alkyl, C$_6$–C$_{15}$-aryl, alkylaryl or arylalkyl, each having 1 to 10 carbon atoms in the alkyl radical and 6 to 20 carbon atoms in the aryl radical,
R$^6$ and R$^7$ are each hydrogen, halogen, C$_1$–C$_{10}$-alkyl, C$_6$–C$_{15}$-aryl, alkylaryl, arylalkyl or alkoxy, each having 1 to 10 carbon atoms in the alkyl radical and 6 to 20 carbon atoms in the aryl radical,
o is an integer from 1 to 3 and
p and q are integers from 0 to 2, the sum o+p+q corresponding to the valency of M$^2$,
preferred compounds are those in which
M$^2$ is lithium, magnesium or aluminum and
R$^5$ to R$^7$ are each C$_1$–C$_{10}$-alkyl.

Particularly preferred metal compounds of the general formula II are n-butyllithium, n-butyl-n-octylmagnesium, n-butyl-n-heptyl-magnesium and tri-n-hexylaluminum.

The conditions for the reaction in stage C) are not critical per se. Temperatures, reaction times and pressures depend on the time when the reaction, ie. activation, is carried out.

The suspension polymerization is known per se. In a conventional procedure, polymerization is carried out in a suspending agent, preferably in an alkane. The polymerization temperatures are in general from –20 to 115° C. and the pressure is generally from 1 to 100 bar. The solids content of the suspension is in general from 10 to 80%. The reaction may be carried out either batchwise, for example in a stirred autoclave, or continuously, for example in a tubular reactor, preferably in a loop reactor. In particular, the reaction can be carried out by the Phillips PF process, as described in U.S. Pat. Nos. 3,242,150 and 3,248,179.

In the novel processes, there are no problems at all with wall coatings and the formation of lumps. The catalyst systems used can be activated at any desired time, can be stored for a long time and are not pyrophoric. Furthermore, polymers which have a narrow molecular weight distribution and are suitable for the production of fibers, films and moldings are formed.

EXAMPLES

Examples 1 and 2

Reaction of SiO$_2$ with triisobutylaluminum (stage A))

Example 1

100 g of SiO$_2$ (SG 332 from Grace; dried for 12 hours at 200° C.) were suspended in 1 l of dry heptane. At room temperature, 140 ml of a 2 molar solution of triisobutylaluminum in heptane were added dropwise in the course of 30 minutes, the temperature increasing to 35° C. Thereafter, stirring was carried out overnight and the solid was filtered off and washed twice with pentane. It was then dried under a reduced pressure from an oil pump until the weight remained constant (carrier 1).

Example 2

50 g of SiO$_2$ (ES 70F from Crosfield; dried for 7 hours at 110° C. under reduced pressure) were suspended in 500 ml of dry heptane. At room temperature, 70 ml of a 2 molar solution of triisobutyl-aluminum in heptane were added dropwise in the course of 30 minutes, the temperature increasing to 35° C. Thereafter, stirring was carried out overnight and the solid was filtered off and washed with heptane. It was then dried under a reduced pressure from an oil pump until the weight remained constant (carrier 2).

Example 3

Reaction of metallocene complex and N,N-dimethylanilinium tetrakis(pentafluorophenyl)borate (stage B))

0.5 mmol of the respective metallocene complex and in each case 0.5 mmol of N,N-dimethylanilinium tetrakis (pentafluorophenyl) borate were dissolved in 50 ml of absolute toluene at 80° C. In each case 5 g of the material obtained according to Example 1 or 2 were added to this and the dispersion thus obtained was stirred for 30 minutes at 80° C. Thereafter, the solvent was dripped off at 10 mbar and the solid residue was dried under reduced pressure from an oil pump until a free-flowing powder remained.

Metallocene complexes used:
III 1: bis(cyclopentadienyl)zirconium dichloride
III 2: bis(n-butylcyclopentadienyl)zirconium dichloride
III 3: bis(trimethylsilylcyclopentadienyl)zirconium dichloride
III 4: dimethylsilanediylbis(indenyl)zirconium dichloride
III 5: dimethylsilanediylbis(-2-methylbenzindenyl) zirconium [sic] dichloride
III 6: dimethylsilanediyl(N-tert-butylamido)($.^5$-2,3,4,5-tetramethylcyclopentadienyl)titanium dichloride Examples 4 to 17

Preparation of Polyethylene in Suspension

A 1 l steel autoclave was heated to 70° C., after which the corresponding metal compound II was injected through a lock with 20 ml of isobutane. Thereafter, ethylene was passed in until the pressure in the autoclave reached 40 bar, and a corresponding amount of the material prepared in Example 3 was blown in with ethylene. The polymerization was carried out at 70° C. until 200 g of ethylene had been absorbed, and was stopped by letting down the pressure.

Metal compounds II used:
II 1: tri-n-hexylaluminum
II 2: n-butyl-n-heptylmagnesium
II 3: n-butyllithium Table 1 below provides information about the compounds used in each case and the properties of the polyethylenes.

The limiting viscosity η was determined according to ISO 1628/3.

TABLE 1

| Ex. | Carrier | Metallocene complex | Amount used of the material prepared according to Ex. 3 [mg] | Metal compound | Productivity [g of polymer/g of catalyst][*) | η [dl/g] |
| --- | --- | --- | --- | --- | --- | --- |
| 4 | 1 | III 1 | 107 | 180 mg II 1 | 1495 | 3.75 |
| 5 | 2 | III 1 | 68 | 168 mg II 1 | 3970 | 4.04 |
| 6 | 2 | III 1 | 88 | 80 mg II 2 | 3460 | 4.06 |
| 7 | 1 | III 2 | 66 | 40 mg II 3 | 2560 | 3.97 |
| 8 | 2 | III 2 | 98 | 80 mg II 2 | 3010 | 4.24 |

TABLE 1-continued

| Ex. | Carrier | Metallocene complex | Amount used of the material prepared according to Ex. 3 [mg] | Metal compound | Productivity [g of polymer/g of catalyst][*) | η [dl/g] |
| --- | --- | --- | --- | --- | --- | --- |
| 9 | 2 | III 2 | 54 | 40 mg II 3 | 4900 | 4.05 |
| 10 | 1 | III 3 | 83 | 80 mg II 3 | 228 | 6.34 |
| 11 | 1 | III 4 | 116 | 20 mg II 3 | 1422 | 2.43 |
| 12 | 2 | III 4 | 41 | 60 mg II 2 | 4580 | 2.89 |
| 13 | 2 | III 5 | 94 | 80 mg II 2 | 2660 | 2.11 |
| 14 | 1 | III 6 | 140 | 60 mg II 2 | 2210 | 24.8 |
| 15 | 1 | III 6 | 81 | 20 mg II 3 | 2690 | 22.89 |
| 16 | 1 | III 6 | 250 | 40 mg II 3 | 506 | 21.2 |
| 17 | 1 | III 6 | 197 | 80 mg II 2 | 535 | 20.22 |

*)Catalyst means the product obtained in stage B)

We claim:
1. A process for the preparation of polymers of alkenes by suspension polymerization in the presence of a catalyst system comprising a solid component wherein the solid component is obtained by a process consisting essentially of the reaction of an inorganic support with a metallocene complex and a compound forming metallocenium ions, wherein

A) the support is prepared by reaction of an inorganic carrier with a metal compound of the formula I

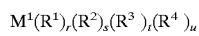

$$M^1(R^1)_r(R^2)_s(R^3)_t(R^4)_u \qquad I$$

where
M$^1$ is an alkali metal, an alkaline earth metal or a metal of main group III or IV of the Periodic Table,
R$^1$ is hydrogen, C$_1$–C$_{10}$-alkyl, C$_6$–C$_{15}$-aryl, alkylaryl or arylalkyl each having 1 to 10 carbon atoms in the alkyl radical and 6 to 20 carbon atoms in the aryl radical,
R$^2$ to R$^4$ are each hydrogen, halogen, C$_1$–C$_{10}$-alkyl, C$_6$–C$_{15}$-aryl, alkylaryl, arylalkyl, alkoxy or dialkylamino each having 1 to 10 carbon atoms in the atoms in the alkyl radical and 6 to 20 carbon atoms in the aryl radical,
r is an integer from 1 to 4 and
s, t and u are integers from 0 to 3 the sum r+s+t+u corresponding to the valency of M$^1$,
and subsequent removal of excess metal compound of the formula I and B) the material obtained according to A) is reacted with a metallocene complex in its metal dihalide form and a compound forming metallocenium ions selected from the group consisting of boron containing strong, neutral Lewis acids, ionic compounds having Lewis acid cations and ionic compounds having Bronsted acids as cations.

2. A process as claimed in claim 1, wherein the reaction of step A) is carried out at a temperature of from 0° C. to 80° C. and a reaction time of from 0.1 to 48 hours.

3. A process as claimed in claim 1, wherein the material obtained according to A) is isolated and dried.

4. A process as claimed in claim 1 wherein, in the formula I,
M$^1$ is aluminum, R$^1$ to R$^3$ are each C$_1$–C$_{10}$-alkyl and u is zero.

5. A process for the preparation of polymers of alkenes by suspension polymerization in the presence of a catalyst system, wherein the catalyst system used is a supported catalyst system obtained by a process wherein first a solid component of a supported catalyst system is prepared by a process consisting essentially of the reaction of an inorganic support with a metallocene complex and a compound forming metallocenium, ions, wherein A) the support is prepared by reaction of an inorganic carrier with a metal compound of the formula I $$M^1(R^1)_r(R^2)_s(R^3)_t(R^4)_u \qquad \text{I}$$

where
$M^1$ is an alkali metal, an alkaline earth metal or a metal of main group III or IV of the Periodic Table,
$R^1$ is hydrogen, $C_1$–$C_{10}$-alkyl, $C_6$–$C_{15}$-aryl, alkylaryl or arylalkyl each having 1 to 10 carbon atoms in the alkyl radical and 6 to 20 carbon atoms in the aryl radical,
$R^2$ to $R^4$ are each hydrogen, halogen, $C_1$–$C_{10}$-alkyl, $C_6$–$C_{15}$-aryl, alkylaryl or alkoxy, or dialkylamino each having 1 to 10 carbon atoms in the alkyl radical and 6 to 20 carbon atoms in the aryl radical,
r is an integer from 1 to 4 and
s, t and u are integers from 0 to 3 the sum r+s+t+u corresponding to the valency of $M^1$, and subsequent removal of excess metal compound of the formula I and B) the material obtained according to A) is reacted with a metallocene complex in its metal dihalide form and a compound forming metallocenium ions selected from the group consisting of boron containing strong, neutral Lewis acids, ionic compounds having Lewis acid cations and ionic compounds having Brönsted acids as cations, and subsequently said solid component of the catalyst system is C) reacted with a metal compound of the formula II $$M^2(R^5)_o(R^6)_p(R^7)_q \qquad \text{II}$$

where
$M^2$ is an alkali metal, an alkaline earth metal or a metal of main group III of the Periodic Table,
$R^5$ is hydrogen, $C_1$–$C_{10}$-alkyl, $C_6$–$C_{15}$-aryl, alkylaryl or arylalkyl each having 1 to 10 carbon atoms in the alkyl radical and 6 to 20 carbon atoms in the aryl radical,
$R^6$ and $R^7$ are each hydrogen, halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical,
o is an integer from 1 to 3 and
p and q are integers from 0 to 2 the sum o+p+q corresponding to the valency of $M^2$.

6. A process as claimed in claim 5, wherein the material obtained according to A) is isolated and dried.

7. A process as claimed in claim 5, wherein the reaction of step A) is carried out at a temperature of from 0° C. to 80° C. and a reaction time of from 0.1 to 48 hours.

8. A process as claimed in claim 5, wherein, in the formula I, $M^1$ is aluminum, $R^1$ to $R^3$ are each $C_1$–$C_{10}$-alkyl and u is zero.

9. A process as claimed in claim 5, wherein, in the formula II, $R^5$ to $R^7$ are each $C_1$–$C_{10}$-alkyl.

10. A process as claimed in claim 5, wherein, the reaction of the solid component of the catalyst system with the metal compound of the formula II takes place in a polymerization reactor.

11. The process of claim 1, wherein said olefin polymers are homopolymers or copolymers of ethylene or propylene.

* * * * *